Figure 1:
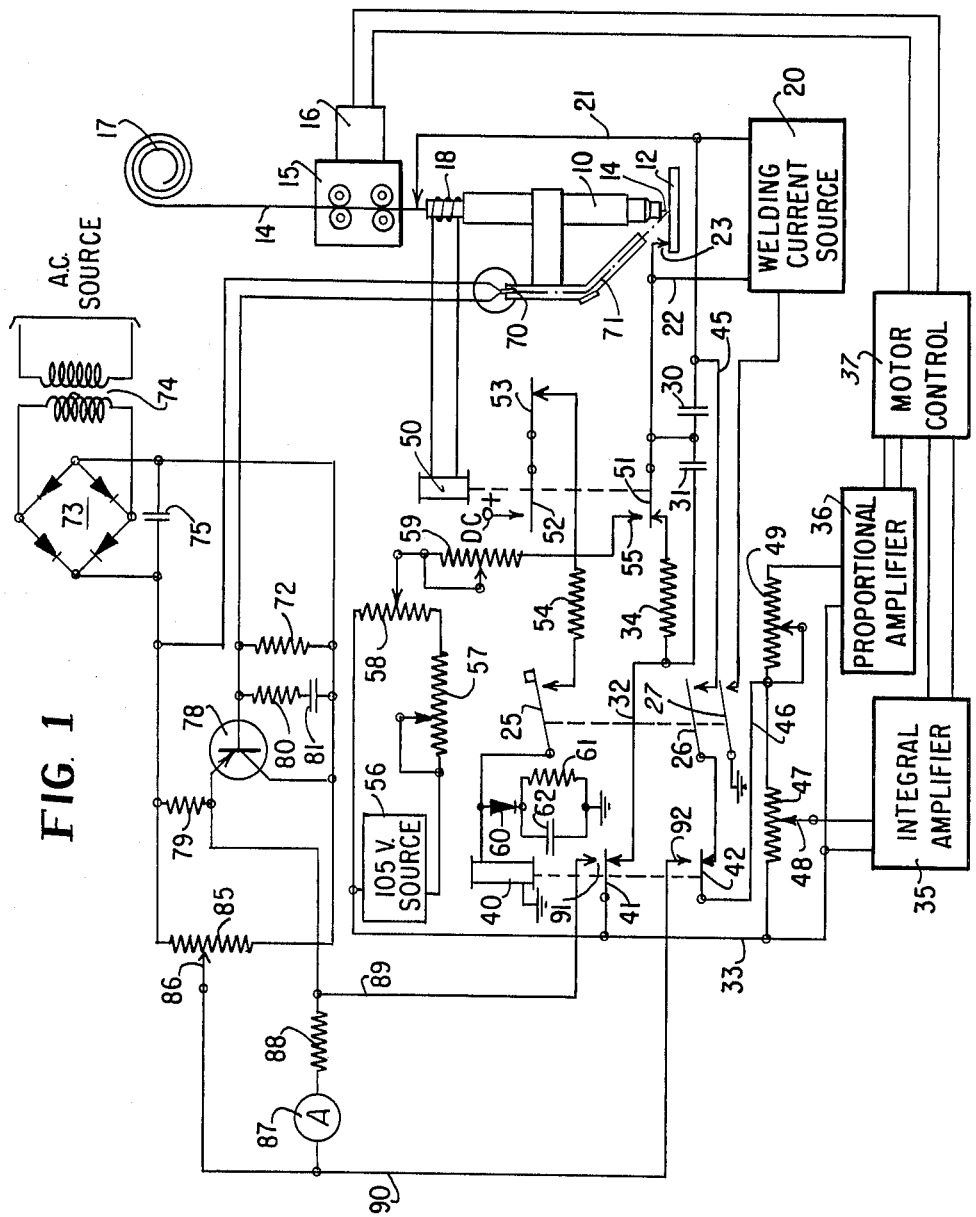

Feb. 22, 1966  C. A. JOHNSON ETAL  3,236,997
SYSTEM FOR CONTROLLING LENGTH OF WELDING ARC
Filed May 24, 1963

INVENTORS
CARLIS A. JOHNSON
ALBERT M. SCIAKY.
BY Mueller and Richele
ATTYS.

United States Patent Office 3,236,997
Patented Feb. 22, 1966

3,236,997
SYSTEM FOR CONTROLLING LENGTH
OF WELDING ARC
Carlis A. Johnson, Lansing, and Albert M. Sciaky, Palos Park, Ill., assignors to Welding Research, Inc., Chicago, Ill., a corporation of Illinois
Filed May 24, 1963, Ser. No. 282,972
16 Claims. (Cl. 219—130)

This invention relates generally to control systems for welding apparatus, and more particularly to a control system for a welding torch in which a consumable electrode is fed therethrough to provide an arc with a work piece.

In welding systems of the metal inert gas type, it is necessary to feed a consumable electrode, which may be in the form of a wire, through a welding torch to provide an arc with a work piece. For best welding action, it is desired that the arc be of fixed length and it is therefore necessary to feed the welding rod as it is consumed so that the end of the welding rod is held at a fixed distance from the work piece.

Systems have been used wherein the feeding of the rod is constant and a constant potential welding power supply is used. This system is unsatisfactory because small changes in arc length lead to appreciable current variations during the welding process. Systems for feeding consumable electrodes have also been used in conjunction with constant current welding power supplies in which the wire feed rate is made to respond to the voltage across the arc. These systems are unsatisfactory because spurious voltages appearing between the contact tube and the electrode produce unwanted arc length changes. Accordingly, neither the system operating with a constant potential welding supply nor those operating with constant current and responding to the potential across the arc have been satisfactory to provide a constant arc length so that consistent welding action takes place.

It is, therefore, an object of the present invention to provide a welding control system which automatically feeds a consumable electrode or wire so that a constant arc length is maintained as the electrode is consumed.

A further object of the invention is to provide a welding electrode controlling system which senses the position of the end of the electrode and feeds the electrode so that this position remains fixed.

Another object of the invention is to provide a control system for feeding a consumable electrode which is initially controlled by the potential between the electrode and the work piece, and which after a predetermined time delay is controlled by optically sensing the boundary position of the electrode to maintain this in fixed position.

A feature of the invention is the provision of a control system for a welding torch having a consumable electrode, including optical means for sensing the position of the end of the electrode, and a control system for feeding the electrode so that the end thereof is held in the desired position.

Another feature of the invention is the provision of a feeding system for a consumable welding electrode including a photo diode with a guiding tube for directing light from the welding arc thereon, and a circuit for producing a voltage which varies with the illumination of the photo diode by the arc, which voltage is compared to a reference voltage to produce an error voltage, with the error voltage being applied to a control system for feeding the electrode so that the end thereof is always at a predetermined position.

A further feature of the invention is the provision of a welding control system including a motor for feeding a consumable electrode, wherein the voltage between the electrode and the work piece is originally sensed and compared with a reference voltage to provide a first error signal, and wherein an optical system senses the position of the end of the electrode and provides a second error signal, with a delay switching device originally applying the first error signal to control the motor, and after a delay applying the second error signal to control the motor.

Figure 2:
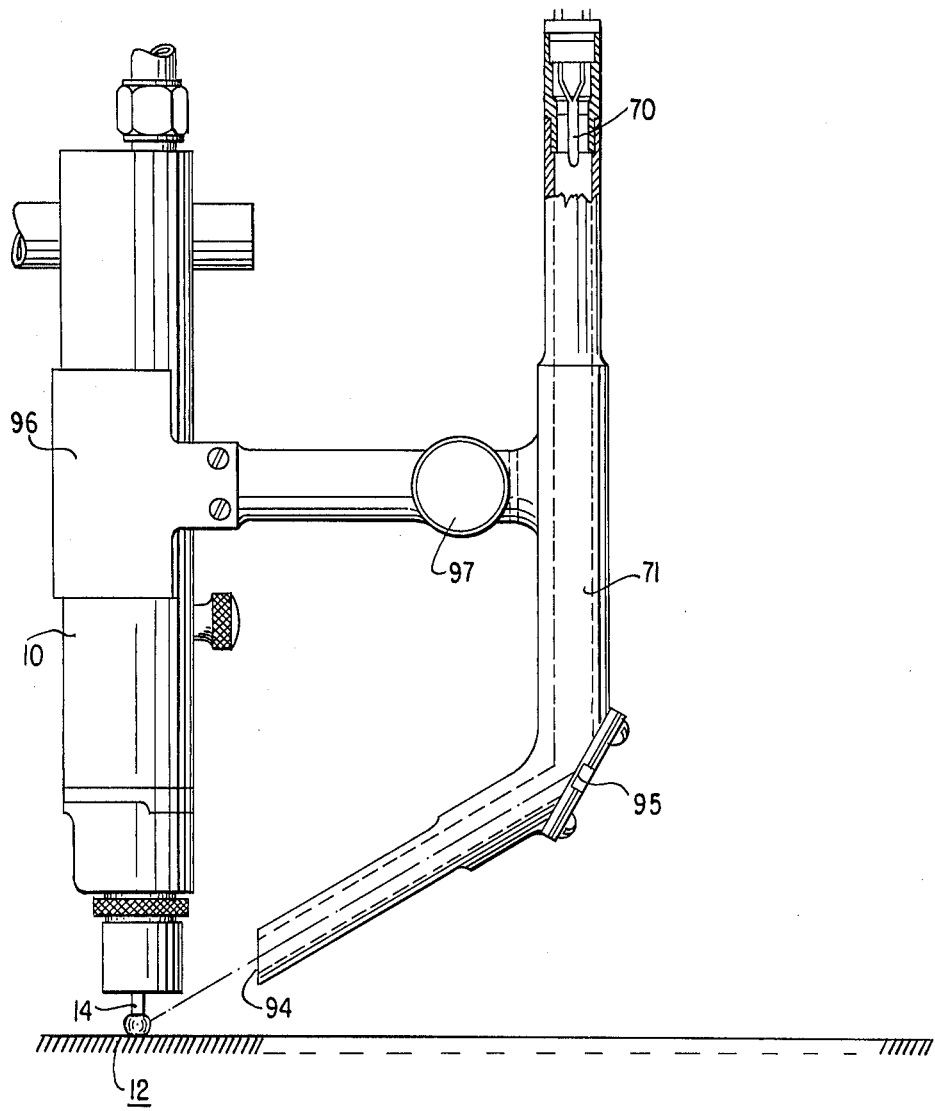

The invention is illustrated in the drawings wherein:
FIG. 1 is a schematic diagram of the system of the invention; and
FIG. 2 shows the structure of the welding gun and the sensing photo diode.

In practicing the invention, there is provided a welding system having a welding torch or gun through which a consumable electrode or wire is fed to a position adjacent the work piece. A welding current source is connected between the wire and the work piece to provide a welding arc between the end of the electrode and the work piece. The torch also applies an inert gas to the welding arc. The wire is fed and positioned by a motor driven unit operated by a control system. Initially the control system responds to the voltage between the welding electrode and the work piece, which voltage is applied to a first capacitor and this voltage is balanced with a reference voltage across a second capacitor. The difference in the voltages across the two capacitors forms a first error signal which is applied to an integral amplifier and a proportional amplifier which together control the operation of the motor to feed the wire. Initially the reference voltage is shorted out and the voltage of the welding source causes the wire to be fed into engagement with the work piece. This shorts the voltage between the electrode and the work piece, and at the same time a current sensing circuit removes the short from the capacitor providing the reference voltage, so that the control causes the feeding device to reverse and the wire is moved away from the work piece producing an arc. Thereafter the voltage between the electrode and the work piece is balanced against the reference voltage to control the feeding of the wire. A time delay circuit is actuated by the current sensing circuit, and after a short time delay actuates a light sensing unit including a photo diode which views the arc at the end of the welding electrode. This diode controls a transistor amplifier to produce a voltage representing the position of the end of the electrode. When the arc is longer more illumination is provided to increase the control voltage, and when the arc is shorter less illumination is provided to decrease the control voltage. The position control voltage is balanced against a second reference voltage to provide a second error signal for controlling the integral amplifier and the proportional amplifier. The second error signal replaces the first error signal after the predetermined time delay, and thereafter controls the feeding of the electrode so that the end thereof remains at a fixed position.

FIG. 1 shows the welding control system of the invention including a welding torch 10 for providing a weld on a work piece 12. The torch 10 operates with a consumable electrode 14 made of a conducting metal such as steel or aluminum wire. The wire electrode may be fed from a roll 17 to the torch 10 by wire feed mechanism 15 operated by motor 16. Current is applied between the electrode and the work piece from a welding current source 20 which may be of the constant current type. The source 20 is connected through conductor 21 to the welding electrode 14, and through conductor 22 to a contact 23 in engagement with the work piece 12.

Operation of the welding system is initiated by operation of switch 25 which may be ganged with switches 26 and 27. These may be mechanically connected, or coupled through a relay whereby operation of start switch 25 causes the various switches to close. Switch 27 operates to energize the welding current source 20 so that a voltage of the order of 80 volts is applied between the welding rod and the work piece. This voltage charges capacitor 30 which is connected across the welding current source. Capacitor 30, together with capacitor 31, provides an error signal which controls the motor 16 to thereby feed the wire electrode through the torch 10 to the work piece. This action takes place through the operation of integral amplifier 35, proportional amplifier 36 and motor control system 37. These elements may operate as described in copending application Serial No. 193,077, filed May 4, 1962 by Marcel Sommeria. As set forth in that application, the integral amplifier may be a servo system which responds to relatively slow, long term changes in the error signal, and the proportional amplifier responds to relatively fast changes in the error signal.

The error signal produced by capacitors 30 and 31 provides control of the system by comparing the voltage between the electrode 14 and work piece 12, which is developed across capacitor 30 to a reference voltage which is applied to capacitor 31. Capacitor 31 is connected through conductor 32 and contact 41 of relay 40 to conductor 33 which is connected to both integral amplifier 35 and proportional amplifier 36. Capacitor 30 is connected through conductor 45, switch 26 and contact 42 of relay 40 to conductor 46. Potentiometer 47 is connected between conductors 33 and 46 and has a movable tap 48 connected to integral amplifier 35. The movable tap 48 is set to select the desired proportion of the error signal for proper operation of the integral amplifier 35. Conductor 46 is connected through variable resistor 49 to the proportional amplifier 36 and provides the error signal thereto, with resistor 49 providing a sensitivity control.

When the system is started by operation of switch 25, the open circuit voltage of the welding current source 20 will be applied across condenser 30. Capacitor 31 is shorted by contact 51 of relay 50 and resistor 34 so that there is essentially no voltage across this capacitor, and the voltage applied to the integral amplifier and the proportional amplifier results entirely from the voltage across capacitor 30. This voltage will cause the motor to feed the wire 14 until it engages the work piece 12. This will short the capacitor 30 so that the voltage thereacross will drop and this will stop the feeding. The current applied through the welding rod will be sensed by the current sensing coil 18 on the welding gun to cause operation of the current sensing relay 50. This will cause contact 51 to move to open the short circuit across capacitor 31, and to engage contact 55 to apply a reference potential to capacitor 31.

The voltage appearing on contact 55 is derived from regulated source 56 which is connected through calibrating resistor 57 to potentiometer 58. The desired portion of this voltage is derived from the movable tap on potentiometer 58 and applied through variable resistor 59 to the contact 55. This voltage is applied to capacitor 31 when the contact 51 is moved to the dotted position by actuation of relay 50. As the voltage across capacitor 30 is zero, the voltage across capacitor 31 is applied to the amplifiers 35 and 36 and causes the feed motor to reverse and retract the wire electrode so that the arc is initiated. When the arc is established, the voltage between the electrode and the work piece is applied across capacitor 30, and the reference voltage is applied to capacitor 31, and the difference between these voltages establishes the error signal which controls the feeding of the wire.

Operation of current sensing relay 50 closes contact 52 thereof to provide a connection from the D.C. potential through closed contact 53, resistor 54, and closed switch contact 25 to a delay network including diode 60, resistor 61 and capacitor 62. Contact 53 may be used to stop the system, and may be operated by a relay or any suitable control means. Relay 40 is connected across the delay network, and is energized after the predetermined time delay. When relay 40 is energized contacts 41 and 42 thereof are moved to the upper dotted positions to disconnect the capacitors 30 and 31 from the integral amplifier and the proportional amplifier. Accordingly the control based on the voltage between the electrode and the work piece is now disconnected, and control is accomplished through the light sensitive control.

The light sensitive arc length control includes a photo diode 70 positioned to sense the illumination of the arc between the wire 14 and work piece 12. A tubular structure 71, to be described in more detail, causes the light on a predetermined portion of the arc to be directed to the photo diode 70. The photo diode 70 is connected in series with resistor 72 across a direct current source produced by rectifier bridge 73, coupled by transformer 74 to an A.C. source. Capacitor 75 provides filtering of the direct current. Conduction of the diode 70 controls the current through resistor 72 to thereby control the voltage thereacross. This voltage is applied to the base electrode of transistor 78, which is connected in an emitter follower circuit. The voltage developed across resistor 79, which is connected to the emitter electrode of transistor 78 is proportional to the illumination applied to the photo diode 70. Resistor 80 and capacitor 81, connected across resistor 72, form a filter network to remove transient spikes which may occur from sudden change in brilliance of the arc, so that these transients will not affect the operation of the emitter follower, and the voltage which is developed thereby across resistor 79.

Connected in parallel with transistor 78 across the direct current supply is potentiometer 85. This potentiometer has a movable contact 86 which can be set to a reference voltage representing arc length. The difference between the potential at the emitter electrode of transistor 78, and that at contact 86 forms an error signal which represents the deviation of the length of the welding arc from the desired length. When the length deviates, the photo diode 70 will cause more or less current to flow to thereby change the conduction of transistor 78 and change the voltage at the emitter electrode thereof. This error signal may be indicated by ammeter 87 connected in series with resistor 88, across conductors 89 and 90. These conductors providing the error signal are connected to contacts 91 and 92 of relay 40, so that when the relay 40 is actuated, the error signal is applied to movable contacts 41 and 42.

When relay 40 is actuated, the error signal provided by the light sensitive system is applied between conductors 33 and 46. As previously stated these conductors apply the potential to the integral amplifier 35 and the proportional amplifier 36 to operate the motor control circuit, which is turn controls the motor 16 to cause feeding mechanism 15 to feed the wire 14. Control is therefore transferred from the constant voltage control system to the light sensitive control system which is effective to position the end of the electrode 14 so that the welding arc is of constant length.

FIGURE 2 shows in more detail the welding torch 10 and the light sensing unit. As previously stated the welding torch 10 has a welding electrode or wire 14 fed therethrough to provide an arc with work piece 12. Also a nozzle is provided about the wire to supply an inert gas, such as argon or helium to the arc. In order to control the position of the bottom end of the wire, to thereby control the length of the arc, the light produced by the arc is sensed. The end 94 of the tubular structure 71 is directed to the arc, and light enters and is reflected by a mirror 95 so that it is directed on the photo diode 70. The tube 71 is constructed with a bend therein so that it can be provided as a more compact unit adjacent the welding torch 10. The tubular structure 71 may be mounted by a bracket 96 secured to the torch, with a pivotal connection 97 making it possible to direct the end 94 of the structure 70 so that the desired portion of the arc is sensed. The structure can be adjusted so that when the end of the wire is in the desired position, the light applied to the photo diode 70 causes it to conduct at 50 percent of its maximum conduction. Then when the arc is longer so that more light is produced, the diode will conduct more, or if the arc is shortened so that less light is produced, the diode will conduct less. The diode 70 operates through the transistor 78 to control the error voltage as has been set forth in connection with FIG. 1.

Accordingly, the invention provides a control system for welding apparatus in which a consumable electrode is used, and which feeds the electrode so that the length of the arc remains fixed. This is accomplished by optically sensing the end of the electrode by the light produced at the arc, by a system using a photo diode and a transistor for providing a control voltage which is a measure of the position of the end of the electrode. This is combined with a system for starting the arc which is responsive to the voltage between the electrode and the work piece. This voltage causes the electrode to be moved into engagement with the work piece and then drawn away to start the arc, and then holds the electrode so that the voltage between the electrode and the work piece remains at a predetermined value. When the arc is started, a current sensing circuit starts a time delay, after which the control from the light sensing system takes over. Control of the feeding takes place through a control system including an integral amplifier and a proportional amplifier which operate a motor control circuit, to control the motor which drives the electrode feeding device. The system has been found to be highly satisfactory in actual use to provide metal inert gas welding with an arc of constant length, to thereby provide the desired welding action.

We claim:

1. In a welding system of the type in which a consumable welding electrode is fed through a welding torch, and wherein current is applied to the electrode to produce an arc between the end thereof and a work piece, the combination including, feeding means for positioning the electrode, driving motor means for operating said feeding means, control means for causing operation of said driving means in accordance with an error voltage applied thereto, means providing a first reference voltage, means responsive to the arc voltage between the welding electrode and the work piece for producing a first error voltage representing the difference of said arc voltage from said first reference voltage, means providing a second reference voltage, means responsive to the position of the end of the welding electrode for producing a position voltage which varies with such position, means producing a second error voltage representing the difference of said positions voltage from said second reference voltage, and switch means for initially applying said first error voltage to said control means, said switch means including time delay means causing operation of said switch means to apply said second error voltage to said control means after a predetermined time.

2. In a welding system of the type in which a consumable welding electrode is fed through a welding torch to provide a welding arc with a work piece, the combination including, current supply means for providing current flow to establish an arc between the welding electrode and the work piece, feeding means for positioning the electrode, driving motor means for operating said feeding means, control means for causing operation of said driving means in accordance with an error voltage applied thereto, means providing a first reference voltage, means responsive to the arc voltage between the welding electrode and the work piece for producing a first error voltage representing the difference of said arc voltage from said first reference voltage, means providing a second reference voltage, means responsive to the position of the end of the welding electrode for producing a position voltage which varies with such position, means producing a second error voltage representing the difference of said positions voltage from said second reference voltage, and switch means for initially applying said first error voltage to said control means, said switch means including current sensing means responsive to current flow through the welding arc and time delay means causing operation of said switch means to apply said second error voltage to said control means at a predetermined time after current flow is established through the welding arc.

3. In a welding system of the type in which a consumable welding electrode is fed through a welding torch and wherein current is applied to the electrode to produce an arc between the end thereof and a work piece, the combination including, current supply means connected between the electrode and the work piece, feeding means for positioning the electrode, driving motor means for operating said feeding means, control means for causing operation of said driving motor means in accordance with an error voltage applied thereto, means providing a first reference voltage, means responsive to the voltage between the welding electrode and the work piece for producing a first control voltage, circuit means applying said control voltage to said control means to cause said driving means to move the electrode into engagement with the work piece so that current flows through the welding electrode, current sensing means connected to the electrode including first relay means, said first relay means operating to apply said reference voltage to said circuit means to provide a first error signal to said control means representing the difference of said control voltage from said first reference voltage, means providing a second reference voltage, means responsive to the position of the end of the welding electrode for producing a position voltage which varies with such position, means producing a second error signal representing the difference of said position voltage from said second reference voltage, time delay means coupled to said first relay means and responsive to operation thereof, and second relay means coupled to said time delay means and operated thereby at a predetermined time interval after said first relay means operates, said second relay means having contacts connected to said circuit means for breaking the connection applying said first error signal to said control means and establishing a connection applying said second error signal to said control means for operating the same to cause the electrode to be positioned at a predetermined distance from the work piece.

4. In a welding system of the type in which a consumable welding electrode is fed through a welding torch and wherein current is applied to the electrode to produce an arc between the end thereof and a work piece, the combination including, current supply means connected between the electrode and the work piece, feeding means for positioning the electrode, driving motor means for operating said feeding means, control means for causing operation of said driving motor means in accordance with an error voltage applied thereto, means providing a first reference voltage, means responsive to the voltage of the welding electrode with respect to the work piece for producing a first error signal representing the difference between said electrode voltage and said reference voltage, circuit means applying said first error signal to said control means and including first relay means, said first relay means acting to disable said first reference voltage whereby said first error signal corresponds to said electrode voltage and operates to cause said driving means to move the electrode into engagement with the work piece so that current flows through the welding electrode, current sensing means coupled to the electrode for operating said first relay means in response to current flow through the electrode, said first relay means operating to render said reference voltage effective whereby said first error signal corresponds to the difference of said control voltage and said first reference voltage, means providing a second reference voltage, means responsive to the position of the end of the welding electrode for producing a position voltage which varies with such position, means producing a second error signal representing the difference of said position voltage from said second reference voltage, time delay means coupled to said first relay means and responsive to operation thereof, and second relay means coupled to said time delay means and operated thereby at a predetermined time interval after said first relay means operates, said second relay means having contacts connected to said circuit means for breaking the connection applying said first error signal to said control means and establishing a connection applying said second error signal to said control means for operating the same to cause the electrode to be positioned at a predetermined distance from the work piece.

5. In welding apparatus of the type in which a consumable welding electrode is fed through a welding torch to strike an arc with a work piece, a system for controlling the position of the end of the welding electrode including in combination, feeding means for positioning the electrode, control means for operating said feeding means in accordance with a control voltage applied thereto, means providing a first reference voltage, means responsive to the voltage across the arc for producing a first error signal representing the difference between said arc voltage and said first reference voltage, means providing a second reference voltage, light sensitive means responsive to the light produced by the arc for producing a voltage which varies with said light, means producing a second error signal representing the difference between said voltage produced by said light sensitive means and said second reference voltage, and switch means for starting said welding apparatus and applying said first error signal to said control means, said switch means including time delay means operating a predetermined time after starting of said welding apparatus for operating said switch means to apply said second error signal to said control means.

6. In welding apparatus of the type in which a consumable welding electrode is fed through a welding torch to strike an arc with a work piece, a system for controlling the position of the end of the welding electrode including in combination, feeding means for positioning the electrode, control means for operating said feeding means in accordance with a control voltage applied thereto, means providing a first reference voltage, means coupled to the electrode and responsive to the voltage across the arc for producing a first error signal representing the difference between said arc voltage and said first reference voltage, means providing a second reference voltage, light sensitive means responsive to the light produced by the arc, said light sensitive means including a photo diode, means for directing light from the arc on said photo diode, a transistor circuit coupled to said photo diode and providing a control voltage which varies with the light applied to said photo diode, means producing a second error signal representing the difference between said control voltage produced by said transistor circuit and said second reference voltage, and switch means for starting said welding apparatus and applying said first error signal to said control means, said switch means including time delay means operating a predetermined time after starting of said welding apparatus for operating said switch means to apply said second error signal to said control means.

7. In welding apparatus of the type in which a consumable welding electrode is fed through a welding torch to strike an arc with a work piece, a system for controlling the position of the end of the welding electrode including in combination, feeding means for positioning the electrode, control means for operating said feeding means in accordance with a control voltage applied thereto, means providing a first reference voltage, means coupled to the electrode and responsive to the voltage across the arc for producing a first error signal representing the difference between said arc voltage and said first reference voltage, light sensitive means responsive to the light produced by the arc, said light sensitive means including a photo diode, means for directing light from the arc on said photo diode, means including direct current supply means and resistor means connected in series with said photo diode across said direct current supply means to provide a control voltage across said resistor means which varies with the light applied to said photo diode, means coupled to said direct current supply means providing a second reference voltage, a transistor connected in an emitter follower circuit and having a base electrode connected to said resistor means so that an amplified control voltage is developed at said emitter electrode, thereof, means coupled to said direct current supply means providing a second reference voltage, means producing a second error signal representing the difference between said amplified control voltage and said second reference voltage, and switch means for starting said welding apparatus and applying said first error signal to said control means, said switch means including time delay means operating a predetermined time after starting of said welding apparatus for operating said switch means to apply said second error signal to said control means.

8. In welding apparatus of the type in which a consumable welding electrode is fed through a welding torch to strike an arc with a work piece, a system for controlling the position of the end of the welding electrode including in combination, current supply means connected to the electrode and the work piece to provide flow of current therebetween, feeding means for positioning the electrode, control means for operating said feeding means in accordance with a control voltage applied thereto, means providing a first reference voltage, means responsive to the voltage across said arc for producing a first error voltage representing the difference between said arc voltage and said first reference voltage, means providing a second reference voltage, light sensitive means responsive to the light produced by the arc and including a photo diode, means for directing light from the arc to said photo diode so that the amount of light applied to said diode varies with the position of the end of the electrode, a control circuit connected to said photo diode for providing a control voltage representing the position of the end of the electrode, means producing a second error signal representing the difference between said control voltage and said second reference voltage, and switch means for starting said welding apparatus and applying said first error signal to said control means, said switch means including time delay means operating a predetermined time after starting of said welding apparatus for operating said switch means to apply said second error signal to said control means to thereby control the position of the end of the electrode and the length of the arc extending therefrom to the work piece.

9. In a welding system of the type in which a consumable welding electrode is fed through a welding torch and wherein current is applied to the electrode to produce an arc between the end thereof and a work piece, the combination including, current supply means connected between the electrode and the work piece, feeding means for positioning the electrode, driving motor means for operating said feeding means, control means for causing operation of said driving motor means in accordance with an error signal applied thereto, means providing a first reference voltage, means responsive to the voltage between the welding electrode and the work piece for producing a first control voltage, circuit means applying said first control voltage to said control means as an error signal to cause said driving means to move the electrode into engagement with the work piece so that current flows through the welding electrode, current sensing means connected to the electrode including first relay means for applying said first reference voltage to said circuit means to provide a first error signal for said control means which represent the difference between said first control voltage and said first reference voltage, light sensitive means responsive to the light produced by the arc, said light sensitive means including a photo diode, means for directing light from the arc to said photo diode so that the amount of light varies with the position of the end of the electrode, a control circuit connected to said photo diode for providing a second control voltage representing the position of the end of the electrode, means providing a second reference voltage, means producing a second error signal representing the difference between said second control voltage and said second reference voltage, time delay means coupled to said first relay means and responsive to operation thereof, and second relay means coupled to said time delay means and operated thereby at a predetermined time after said first relay means operates, said second relay means having contacts connected to said circuit means for breaking the connection applying said first error signal to said control means and establishing a connection applying said second error signal to said control means for operating the same to cause the electrode to be positioned at a predetermined distance from the work piece.

10. In a welding system of the type in which a consumable welding electrode is fed through a welding torch and wherein current is applied to the electrode to produce an arc between the end thereof and a work piece, the combination including, current supply means connected between the electrode and the work piece, feeding means for positioning the electrode, driving motor means for operating said feeding means, control means for causing operation of said driving motor means in accordance with an error signal applied thereto, means providing a first reference voltage, means responsive to the voltage between the welding electrode and the work piece for producing a first control voltage, circuit means applying said first control voltage to said control means as an error signal to cause said driving means to move the electrode into engagement with the work piece so that current flows through the welding electrode, current sensing means connected to the electrode including first relay means for applying said first reference voltage to said circuit means to provide a first error signal for said control means which represent the difference between said first control voltage and said first reference voltage, light sensitive means responsive to the light produced by the arc, said light sensitive means including a photo diode, light transmitting means for directing light from the arc to said photo diode so that the amount of light varies with the position of the end of the electrode, said light transmitting means including first and second tubular sections positioned at an angle with respect to each other and a mirror at the junction of said first and second sections, means including direct current supply means and resistor means connected in series with said photo diode across said supply means to provide a second control voltage across said resistor means which varies with the light applied to said photo diode, a transistor connected in an emitter follower circuit and having a base electrode connected to said resistor means so that an amplified control voltage is developed at said emitter electrode thereof, means coupled to said supply means providing a second reference voltage, means producing a second error signal representing the difference between said amplified control voltage and said second reference voltage, time delay means coupled to said first relay means and responsive to operation thereof, and second relay means coupled to said time delay means and operated thereby at a predetermined time after said first relay means operates, said second relay means having contacts connected to said circuit means for breaking the connection applying said first error signal to said control means and establishing a connection applying said second error signal to said control means for operating the same to cause said feeding means to hold the electrode so that the end thereof is positioned at a predetermined distance from the work piece and the length of the arc remains substantially constant.

11. In welding apparatus of the type in which a consumable welding electrode is fed through a welding torch to strike an arc with a work piece, a system for controlling the position of the end of the welding electrode including in combination, feeding means for positioning the electrode, control means for operating said feeding means in accordance with a control voltage applied thereto, said control means including an integral amplifier portion responsive to relatively slow changes in the control voltage and a proportional amplifier portion responsive to relatively fast changes in the control voltage, light sensitive means responsive to the light produced by the arc, said light sensitive means including a photo diode, means for directing light from the arc on said photo diode, a transistor circuit coupled to said photo diode and providing a control voltage which varies with the light applied to said photo diode, means providing a reference voltage, means producing an error signal representing the difference between said control voltage produced by said transistor circuit and said reference voltage, and means for applying said error signal to said control means.

12. In welding apparatus of the type in which a consumable welding electrode is fed through a welding torch to strike an arc with a work piece, a system for controlling the position of the end of the welding electrode including in combination, feeding means for positioning the electrode, control means for operating said feeding means in accordance with a control voltage applied thereto, said control means including an integral amplifier portion responsive to relatively slow changes in the control voltage and a proportional amplifier portion responsive to relatively fast changes in the control voltage, light sensitive means responsive to the light produced by the arc, said light sensitive means including a photo diode, means for directing light from the arc to said photo diode so that the amount of light applied to said diode varies with the position of the end of the electrode, a control circuit connected to said photo diode for providing a control voltage representing the position of the end of the electrode, means providing a reference voltage, means producing an error signal representing the difference between said control voltage and said reference voltage, and means for applying said error signal to said control means to thereby control the position of the end of the electrode and the length of the arc extending therefrom to the work piece.

13. In welding apparatus of the type in which a consumable welding electrode is fed through a welding torch to strike an arc with a work piece, a system for controlling the position of the end of the welding electrode including in combination, feeding means for positioning the electrode, control means for operating said feeding means in accordance with a control voltage applied thereto, said control means including an integral amplifier portion responsive to relatively slow changes in the control voltage and a proportional amplifier portion responsive to relatively fast changes in the control voltage, light sensitive means responsive to the light produced by the arc, said light sensitive means including a photo diode, means for directing light from the arc on said photo diode so that the amount of light applied thereto varies with the position of the end of the electrode, means including direct current supply means and resistor means connected in series with said photo diode across said supply means to provide a control voltage across said resistor means which varies with the light applied to said photo diode, a transistor connected in an emitter follower circuit and having a base electrode connected to said resistor means so that an amplified control voltage is developed at said emitter electrode thereof, means coupled to said direct current supply means providing a second reference voltage, means producing an error signal representing the difference between said amplified control voltage and said reference voltage, and means for applying said error signal to said control means to control the feeding of said electrode so that the end thereof remains at fixed position.

14. In a welding system of the type in which a consumable welding electrode is fed through a welding torch and wherein current is applied to the electrode to produce an arc between the end thereof and a work piece, the combination including, feeding means for positioning the electrode, driving motor means for operating said feeding means, control means for causing operation of said driving motor means in accordance with an error signal applied thereto, light sensitive means responsive to the light produced by the arc, said light sensitive means including a photo diode, light transmitting means for directing light from the arc to said photo diode so that the amount of light varies with the position of the end of the electrode, said light transmitting means including first and second tubular sections positioned at an angle with respect to each other and a mirror at the junction of said first and second sections, means including direct current supply means and resistor means connected in series with said photo diode across said supply means to provide a control voltage across said resistor means which varies with the light applied to said photo diode, a transistor connected in an emitter follower circuit and having a base electrode connected to said resistor means so that an amplified control voltage is developed at said emitter electrode thereof, means coupled to said supply means providing a reference voltage, means producing an error signal representing the difference between said amplified control voltage and said reference voltage, and means for applying said error signal to said control means for operating the same to cause said feeding means to hold the electrode so that the end thereof is positioned at a predetermined distance from the work piece and the length of the arc remains substantially constant.

15. In welding apparatus of the type in which a welding electrode is positioned to strike an arc with a work piece, a system for controlling the welding operation including in combination, welding control means operating in accordance with a control voltage applied thereto, means providing a first reference voltage, means responsive to the voltage across the arc for producing a first error signal representing the difference between said arc voltage and said first reference voltage, means providing a second reference voltage, light sensitive means responsive to the light produced by the arc for producing a voltage which varies with such light, means producing a second error signal representing the difference between said voltage produced by said light sensitive means and said second reference voltage, and switch means for starting said welding apparatus and applying said first error signal to said control means, said switch means including time delay means operating a predetermined time after starting of said welding apparatus for operating said switch means to apply said second error signal to said control means.

16. In welding apparatus of the type in which a welding electrode is positioned to strike an arc with a work piece, a system for controlling the welding operation including in combination, control means operating in accordance with a control voltage applied thereto, said control means including an integral amplifier portion responsive to relatively slow changes in the control voltage and a proportional amplifier portion responsive to relatively fast changes in the control voltage, light sensitive means responsive to the light produced by the arc, said light sensitive means including a photo diode, means for directing light from the arc on said photo diode, a transistor circuit coupled to said photo diode and providing a voltage which varies with the light applied to said photo diode, means providing a reference voltage, means producing an error voltage representing the difference between said voltage produced by said transistor circuit and said reference voltage, and means for applying said error voltage to said control means.

References Cited by the Examiner
UNITED STATES PATENTS

| | | | |
|---|---|---|---|
| 2,031,288 | 2/1936 | Tripp | 314—63 X |
| 2,223,177 | 11/1940 | Jones | 314—63 |
| 2,476,808 | 7/1949 | Brubaker | 314—64 X |
| 2,662,991 | 12/1953 | Gretener | 314—63 X |

RICHARD M. WOOD, *Primary Examiner.*

JOSEPH V. TRUHE, SR., *Examiner.*